(12) United States Patent
Abe et al.

(10) Patent No.: US 10,308,149 B2
(45) Date of Patent: Jun. 4, 2019

(54) VEHICLE SEAT

(71) Applicant: TACHI-S CO., LTD., Tokyo (JP)

(72) Inventors: Hitoshi Abe, Tokyo (JP); Takahiko Suzuki, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 15/651,799

(22) Filed: Jul. 17, 2017

(65) Prior Publication Data

US 2018/0022255 A1 Jan. 25, 2018

(30) Foreign Application Priority Data

Jul. 20, 2016 (JP) .................. 2016-142522

(51) Int. Cl.
*B60N 2/64* (2006.01)
*B60N 2/58* (2006.01)

(52) U.S. Cl.
CPC ......... *B60N 2/5883* (2013.01); *B60N 2/5891* (2013.01); *B60N 2/64* (2013.01)

(58) Field of Classification Search
CPC ....... B60N 2/5883; B60N 2/5891; B60N 2/64
USPC ................. 297/452.62, 452.58, 218.1, 218.2
See application file for complete search history.

(56) References Cited

U.S. PATENT DOCUMENTS 5,733,001 A * 3/1998 Roberts ................ B60N 2/5825
24/297

2006/0113762 A1 * 6/2006 Tracht ................... B60R 21/207
280/730.2
2012/0187731 A1 7/2012 Guadagno
2014/0375105 A1 12/2014 Okugawa et al.

FOREIGN PATENT DOCUMENTS

| CN | 102602314 A | 7/2012 |
| CN | 203987111 U | 12/2014 |
| DE | 20 2006 003 019 U1 | 6/2006 |
| JP | 59-75351 U | 5/1984 |
| JP | 10-309220 A | 11/1998 |
| KR | 1998-035358 U | 9/1998 |

OTHER PUBLICATIONS

Chinese Office Action dated Jan. 31, 2019, for Chinese Application No. 201710591991.9, 12 pages. (With English Translation).

* cited by examiner

*Primary Examiner* — Syed A Islam
(74) *Attorney, Agent, or Firm* — Seed IP Law Group LLP

(57) ABSTRACT

A vehicle seat includes: a pad including: a first pad part; a second pad part; a step portion formed along at least a part of the boundary; and a groove portion extending from the step portion into between the first and second pad parts over the whole length of the step portion; and a trim cover formed by sewing multiple skin pieces together, the skin pieces including: a first body configured to cover the surface of the first pad part following the surface of the step portion; a first gore configured to cover the surface of the step portion; a second body configured to cover the surface of the second pad part following the surface of the step portion; and a second gore jointed to the second body, wherein an edge of the first gore and an edge of the second gore are respectively stored in the groove portion.

6 Claims, 9 Drawing Sheets

VEHICLE SEAT

CROSS-REFERENCE TO RELATED APPLICATION(S)

This application is based upon and claims the benefit of priority from Japanese Patent Application No. 2016-142522, filed on Jul. 20, 2016, the entire contents of which are incorporated herein by reference.

BACKGROUND

1. Field of the Invention

The invention relates to a vehicle seat.

2. Description of the Related Art

A vehicle seat typically includes a pad and a trim cover for covering the pad. The trim cover is formed by sewing multiple skin pieces. For example, a trim cover for covering a pad of a seat cushion includes, as the skin piece thereof, a body for covering the seat surface of the pad and a gore for covering the side surfaces of the pad (see, for example, JP-UM-A-S59-75351).

The gore is also applied to covering the surface of the step portion of the pad. A vehicle seat 61 shown in FIG. 8 is a seat to be installed on the passenger seat side of the rear of a vehicle. A seat back 63 includes an auxiliary seat back 63a formed integrally therewith which is to be interposed between the seat back 63 and a driver's seat side seat (not shown). In the auxiliary seat back 63a, there is stored a pull-out type armrest 65 tiltable toward to the seat cushion side.

As shown in FIG. 9, a pad 66 of the seat back 63 includes a first pad part 71 and a second pad part 72 disposed adjacent to the first pad part 72. The second pad part 72 constitutes a pad of the auxiliary seat back 63a (see FIG. 8), while the first pad part 71 constitutes a pad of the seat back 63 (see FIG. 8) except for the auxiliary seat back 63a. The first and second pads 71 and 72 are integrally formed. The upper end of the second pad part 72 is positioned lower than the upper end of the first pad part 71 and is formed concave with respect to the upper end of the first pad part 71; and, a step portion 73 is formed along at least a part of the boundary between the upper ends of the first and second pad parts 71 and 72.

A trim cover 67 of the vehicle seat 61 integrally covers the first and second pads 71 and 72 and includes, as the skin pieces thereof, a first body 67a for covering the upper end face of the first pad part 71 following the surface of the step portion 73, a second body 67c for covering the upper end face of the second pad part 72 following the surface of the step portion 73, and a gore 67b jointed to the first and second bodies 67a and 67c for covering the surface of the step portion 73.

In the vehicle seat 61 shown in FIGS. 8 and 9, a seam allowance 68a between the first body 67a and gore 67b of the trim cover 67 and a seam allowance 68b between the second body 67c and gore 67c are both brought down on the gore 67b side and are superimposed on the surface of the step portion 73.

The step height H of the step portion 73 is set, for example, according to a seat design. When the width of the seam allowances 68a and 68b with respect to the step height H is excessively large, the seam allowances 68a and 68b are superimposed on each other on the surface of the step portion 73. For example, supposing the width of the seam allowances 68a and 68b is typically set to 7~8 mm in consideration of the workability or the like of sewing, when the step height H is 15 mm or less, the seam allowances 68a and 68b are superimposed on each other on the surface of the step portion 73. When the seam allowances 68a and 68b are superimposed, there is a fear that wrinkles or sags can occur in the gore 67b covering the seam allowances 68a and 68b, thereby impairing the appearance of the vehicle seat 61.

There is a limit to reducing the width of the seam allowances 68a and 68b and, due to this, reduction of the step height H of the step portion 73 is also restricted, thereby restricting the design of the seat.

SUMMARY

The invention is made in view of the above circumstances and thus it is an object of the invention that, in a vehicle seat with a pad including a step portion, occurrence of wrinkles or sags in a trim cover for covering the step portion can be suppressed and also the freedom of the design of the seat can be enhanced.

According to an aspect of the invention, there is provided a vehicle seat including: a pad including: a first pad part; a second pad part arranged adjacent to the first pad part and formed concave with respect to the first pad part along at least a part of the boundary with the first pad; a step portion formed along at least a part of the boundary; and a groove portion extending from the step portion into between the first and second pad parts over the whole length of the step portion; and a trim cover configured to cover the pad integrally, the trim cover formed by sewing multiple skin pieces together, the skin pieces including: a first body configured to cover the surface of the first pad part following the surface of the step portion; a first gore, jointed to the first body, configured to cover the surface of the step portion; a second body configured to cover the surface of the second pad part following the surface of the step portion; and a second gore jointed to the second body, wherein an edge of the first gore and an edge of the second gore are respectively stored in the groove portion.

According to the invention, in a vehicle seat with a pad including a step portion, occurrence of wrinkles or sags in a trim cover for covering the step portion can be suppressed and also the freedom of the design of the seat can be enhanced.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
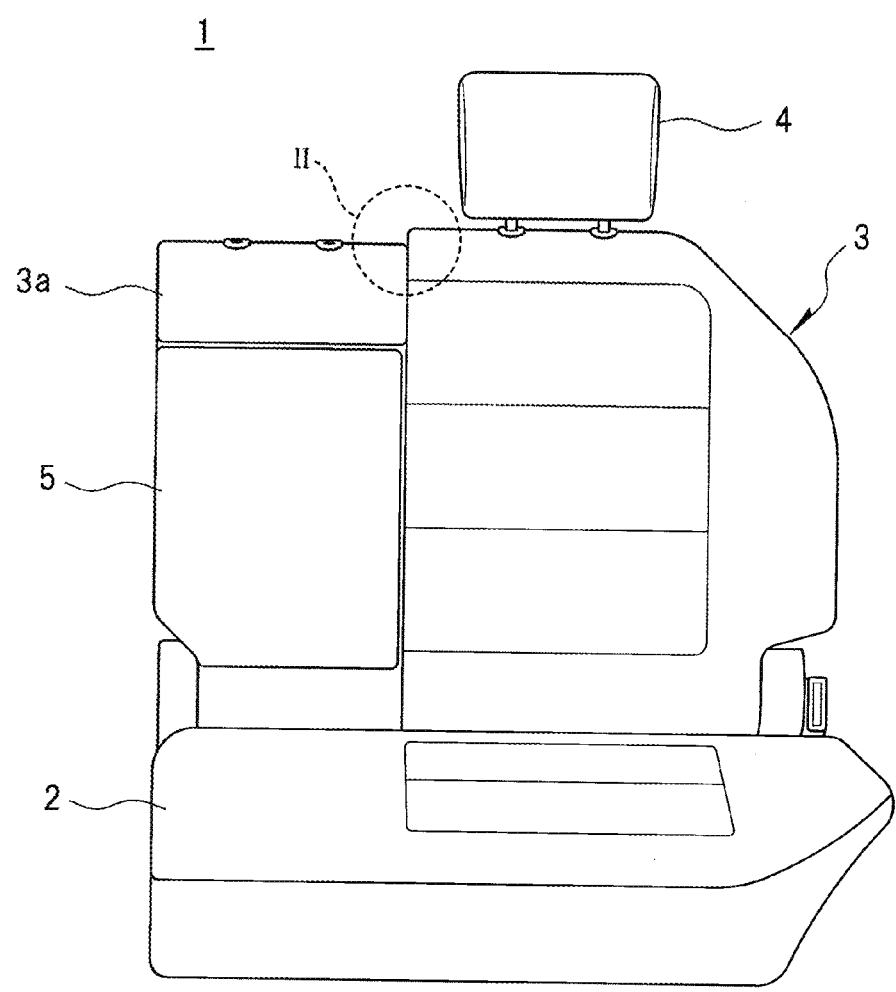
FIG. 1 is an explanatory front view of a first embodiment of a vehicle seat according to the invention.

FIG. 1 shows an example of a vehicle seat in order to explain a first embodiment of the invention.

A vehicle seat 1 shown in FIG. 1 is a seat which is to be installed on the passenger side seat of the rear part of a vehicle and includes a seat cushion 2 constituting a seat surface part of the seat, a seat back 3 constituting a back rest part of the seat, and a headrest 4 for supporting the head of a passenger seated on the seat. The seat back 3 includes an auxiliary seat back 3a formed integrally therewith to be interposed between the seat 1 and a seat (not shown) on the driver's seat side; and, in the auxiliary seat back 3a, there is stored a pull-out type armrest 5 tillable toward the seat cushion 2.

The seat cushion 2, seat back 3, headrest 4 and armrest 5 respectively include a pad formed of foam material such as urethane foam and a frame for supporting the pad. The respective pads of the seat cushion 2, seat back 3, headrest 4 and armrest 5 are covered by a trim cover.

The trim cover is formed by sewing multiple skin pieces together. As the skin piece, there is used, for example, leather (natural leather, synthetic leather) or cloth (woven fabric, knitted fabric, unwoven fabric). The skin piece may have a single layer structure of leather or cloth, or may have a multilayer structure in which leather or cloth is used as an outer layer and wadding (for example, resin foam such as elastically deformable flexible polyurethane foam) is laminated thereon. And, the trim cover may be formed of the same kind of skin pieces or may be formed of multiple kinds of skin pieces different depending on the locations of the trim cover.

Figure 2:
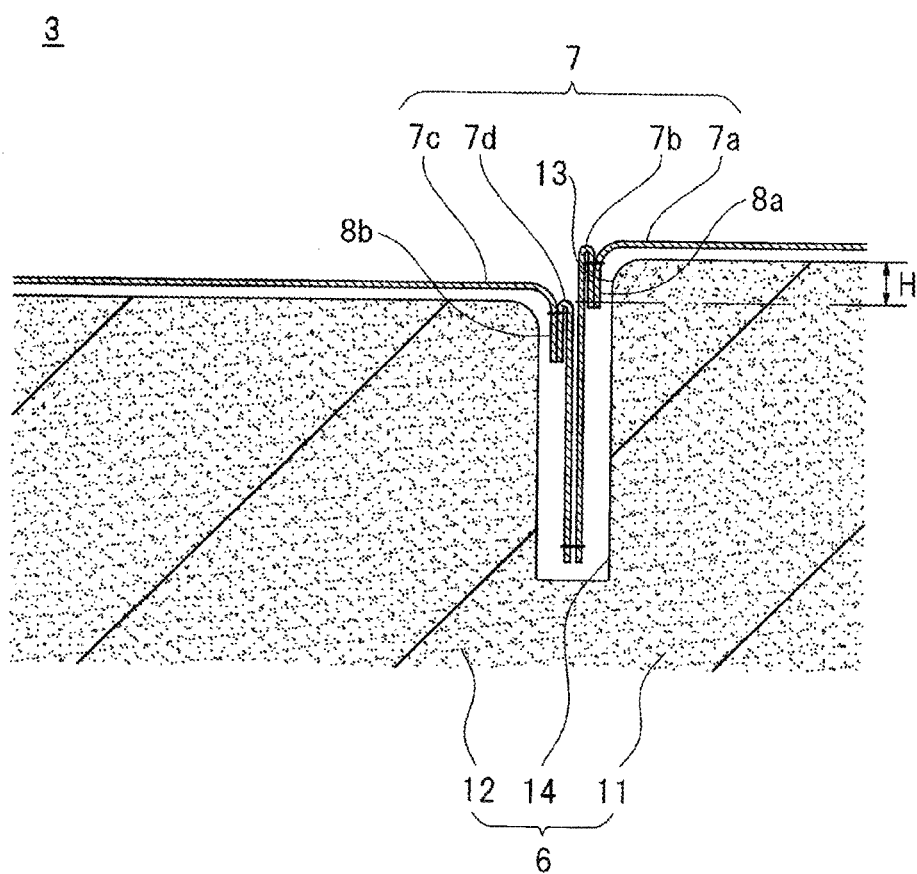
FIG. 2 is a section view of a part surrounded by the dashed circle II of FIG. 1.

FIG. 2 shows the section of the upper end part of the seat back 3.

A pad 6 of the seat back 3 includes a first pad part 11 and a second pad part 12 arranged adjacent to the first pad part 11. The second pad part 12 constitutes a pad of the auxiliary seat back 3a (see FIG. 1), and the first pad part 11 constitutes a pad of the seat back 3 except for the auxiliary seat back 3a. The first and second pads 11 and 12 are integrally formed.

The upper end of the second pad part 12 is situated lower than the upper end of the first pad part 11 and is formed convex with respect to the upper end of the first pad part 11, while a step portion 13 is formed along at least a part of the boundary between the upper ends of the first and second pad parts 11 and 12. And, in the pad 6, there is formed a groove portion 14 which extends from the step portion 13 into between the first and second pad parts 11 and 12 in the vertical direction over the whole length of the step portion 13.

The trim cover 7 for covering the pad 6 includes, as the skin pieces thereof, a first body 7a for covering the upper end face of the first pad part 11 following the surface of the step portion 13, a first gore 7b jointed to the first body 7a for covering the surface of the step portion 13, a second body 7c for covering the upper end face of the second pad part 12 following the surface of the step portion 13, and a second gore 7d jointed to the second body 7c.

The respective edges of the first and second gores 7b and 7d are sewn together in a superimposed state and are stored in the groove portion 14 of the pad 6.

A seam allowance 8a of the first body 7a and first gore 7b is brought down to the first gore 7b side and is superimposed on the surface of the step portion 13. A seam allowance 8b of the second body 7c and second gore 7d is brought down to the second gore 7d side but is inserted into the groove portion 14. Thus, the seam allowance 8b will not be superimposed on the seam allowance 8a on the surface of the step portion 13.

Since the seam allowances 8a and 8b are not superimposed on each other on the surface of the step portion 13, it is possible to suppress occurrence of wrinkles or sags in the first gore 7b which is superimposed on the surface of the step portion 13 and appears on the external surface of the vehicle seat 1. This makes it possible to suppress the deteriorated appearance of the vehicle seat 1 caused by such wrinkles or sags. And, the width of the seam allowances 8a and 8b can be set properly in consideration of sewing workability etc. regardless of the size of the step height H of the step portion 13. The above configuration can ease the constraints of the step height H of the step portion 13, thereby enabling enhancement in the freedom of design of the vehicle seat 1.

The above configuration of the pad 6 and trim cover 7 is particularly useful when the maximum value of the step height H of the step portion 13 is relatively small, for example, 15 mm or less.

Figure 3:
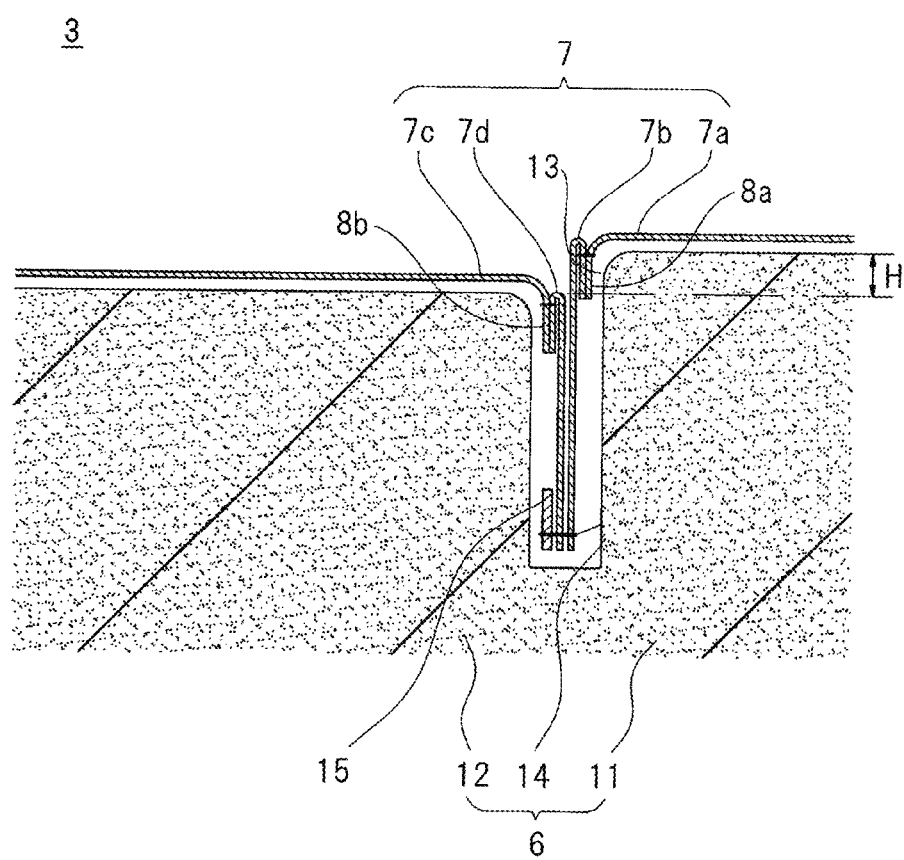
FIG. 3 is a section view of a first modification of the vehicle seat of FIG. 1.
Figure 4:
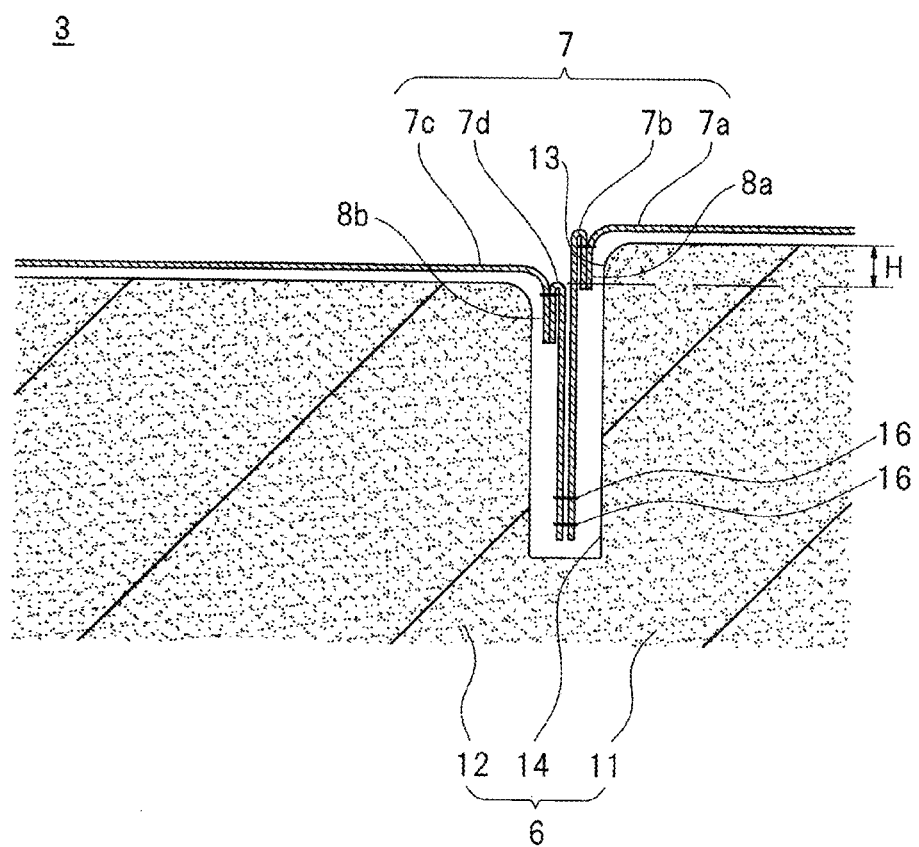
FIG. 4 is a section view of a second modification of the vehicle seat of FIG. 1.

FIGS. 3 and 4 respectively shows modifications of the vehicle seat 1.

In a modification shown in FIG. 3, the respective edges of the first and second gores 7b and 7d of the trim cover 7 stored in the groove portion 14 of the pad 6 are sewn together integrally with a reinforcing member 15. This configuration can enhance the rigidity of the first gore 7b appearing on the external surface of the vehicle seat 1, thereby enabling more positive suppression of wrinkles or sags in the first gore 7b. The reinforcing member is not limited particularly but, for example, it may be a sheet member made of resin, or the end portion of leather or cloth forming the trim cover 7.

Also, in a modification shown in FIG. 4, the respective edges of the first and second gores 7b and 7d of the trim cover 7 stored in the groove portion 14 of the pad 6 are sewn together by multiple rows (in the illustrated example, two rows) of mutually parallel arranged seams 16. This configuration can enhance the rigidity of the first gore 7b appearing on the external surface of the vehicle seat 1, thereby enabling more positive suppression of wrinkles or sags in the first gore 7b.

Figure 5:
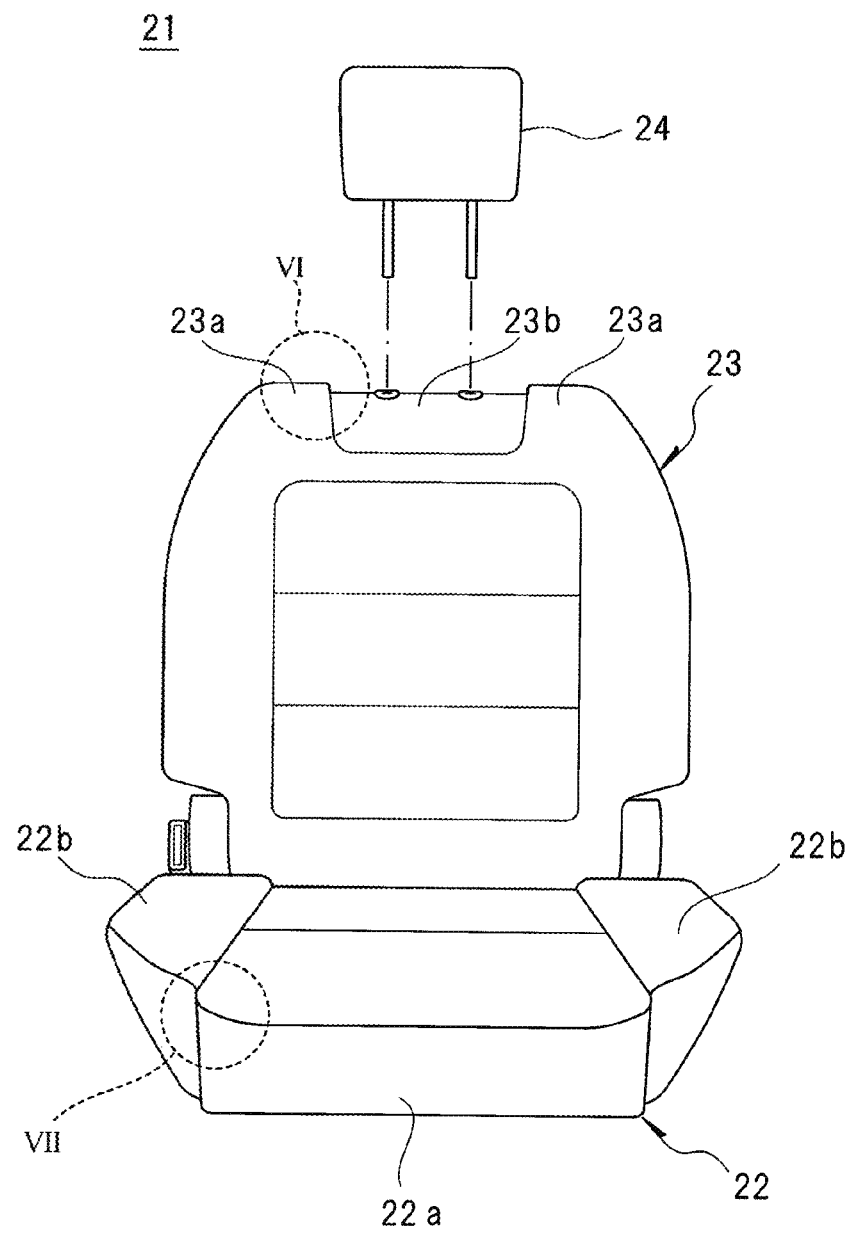
FIG. 5 is an explanatory front view of a second embodiment of the vehicle seat of the invention.

FIG. 5 is an explanatory view of a second embodiment of the vehicle seat of the invention.

A vehicle seat 21 shown in FIG. 5 is a seat to be installed in the front part of a vehicle, and includes a seat cushion 22, a seat back 23 and a headrest 24. The seat cushion 22, a seat back 23 and a headrest 24 respectively include a pad, while the respective pads of the seat cushion 22, seat back 23 and headrest 24 are covered by a trim cover.

Figure 6:
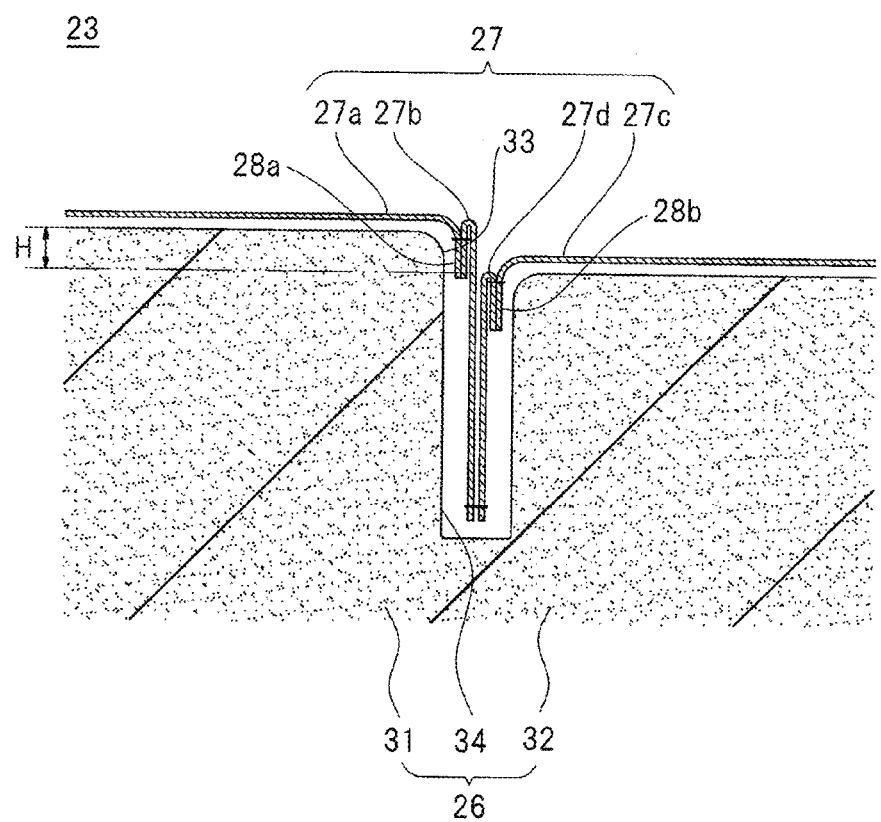
FIG. 6 is a section view of a part surrounded by the dashed circle VI of FIG. 5.

FIG. 6 shows a section of the upper end part of the seat back 23.

The pad 26 of the seat back 23 includes a first pad part 31 and a second pad part 32 arranged adjacent to the first pad part 31. The first pad part 31 constitutes the pads of shoulder parts 23a (see FIG. 5) arranged on the two sides of the seat back 23 in the width direction, while the second part 32 is situated between the width-direction two sides shoulder parts 23a and constitutes the pad of the central part 23b (see FIG. 5) on which the headrest 24 will be mounted. The first and second pad parts 31 and 32 are integrally formed.

The upper end of the second pad part 32 is situated lower than the upper end of the first pad part 31 and is formed convex with respect to the upper end of the first pad part 31, while a step portion 33 is formed along at least a part of the boundary between the upper ends of the first and second pad parts 31 and 32. And in the pad 26, there is formed a groove portion 34 which extends from the step portion 33 into between the first and second pad parts 31 and 32 vertically along the whole length of the step portion 33.

The trim cover 27 for covering the pad 26 includes, as the skin pieces thereof, a first body 27a for covering the upper end face of the first pad part 31 following the surface of the step portion 33, a first gore 27b jointed to the first body 27a for covering the surface of the step portion 33, a second body 27c for covering the upper end face of the second pad part 32 following the surface of the step portion 33, and a second gore 27d jointed to the second body 27c.

The respective edges of the first and second gores 27b and 27d are sewn together in a superimposed state and are stored in the groove portion 34 of the pad 26.

A seam allowance 28a of the first body 27a and first gore 27b is brought down to the first gore 7b side and is superimposed on the surface of the step portion 33. A seam allowance 28b of the second body 27c and second gore 27d is brought down to the second gore 27d side but is inserted into the groove portion 34. Thus, the seam allowance 28b will not be superimposed on the seam allowance 28a on the surface of the step portion 33.

Since the seam allowances 28a and 28b are not superimposed on each other on the surface of the step portion 33, it is possible to suppress occurrence of wrinkles or sags in the first gore 27b which is superimposed on the surface of the step portion 33 and appears on the external surface of the vehicle seat 21. This configuration can suppress the deteriorated appearance of the vehicle seat 21 caused by such wrinkles or sags. And, the width of the seam allowances 28a and 28b can be set properly in consideration of sewing workability etc. regardless of the size of the step height H of the step portion 33. This configuration can ease the constraints of the step height H of the step portion 33, thereby enabling enhancement in the freedom of design of the vehicle seat 21.

Here, in order to suppress the occurrence of wrinkles or sags in the first gore 27b by enhancing the rigidity of the first gore 27b appearing on the external surface of the vehicle seat 21, the respective edges of the first and second gores 27b and 27d to be stored into the groove portion 34 of the pad 26, as shown in FIG. 3, may be sewn together integrally with the reinforcing member, or, as shown in FIG. 4, may be sewn together by multiple rows of seams.

Figure 7:
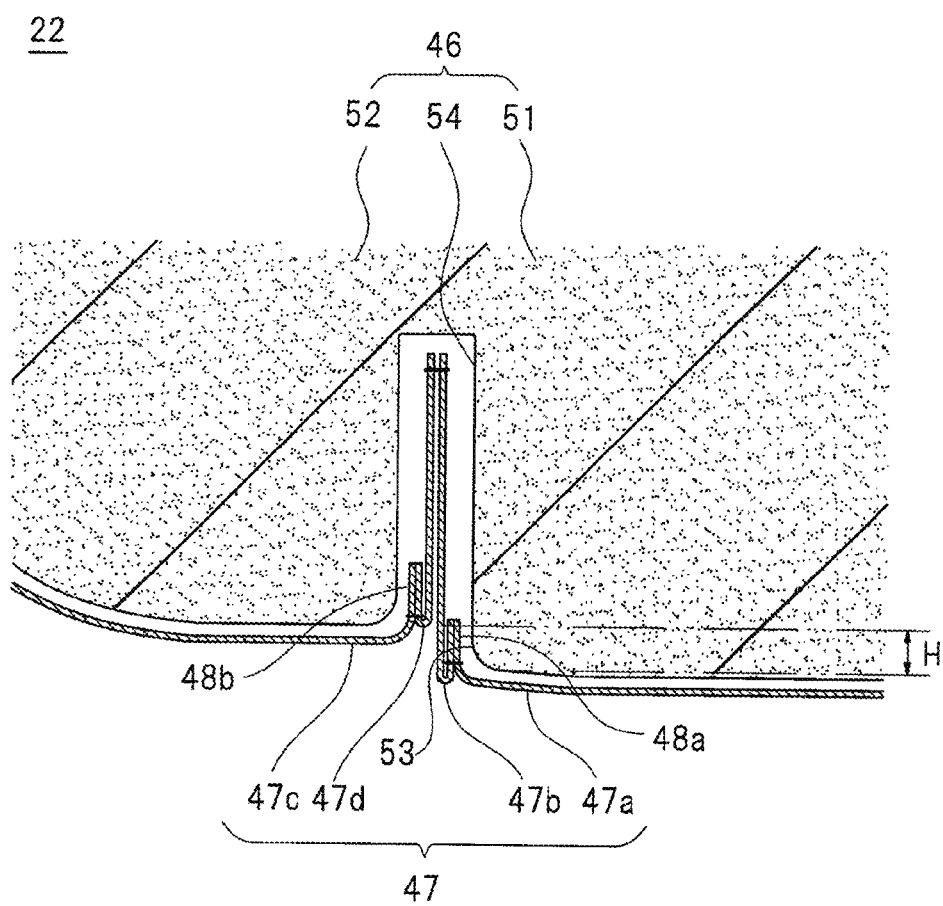
FIG. 7 is a section view of a part surrounded by the dashed circle VII of FIG. 5.
Figure 8:
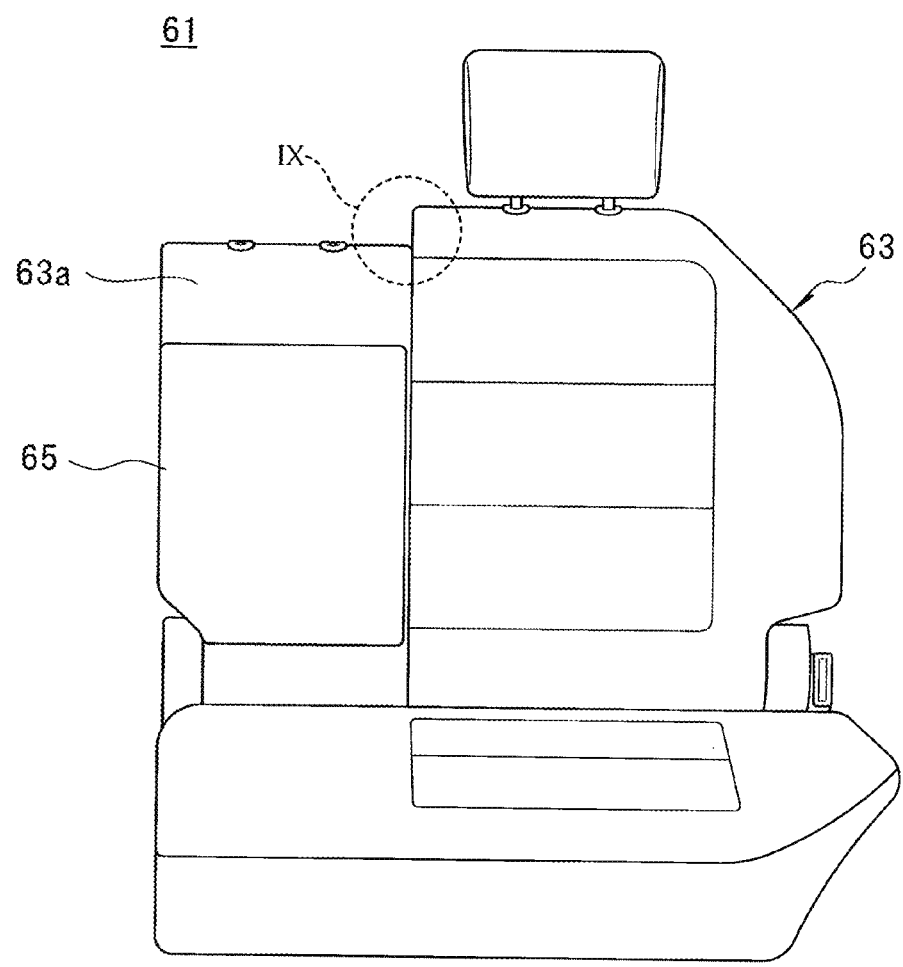
FIG. 8 is a front view of an example of a conventional vehicle seat.
Figure 9:
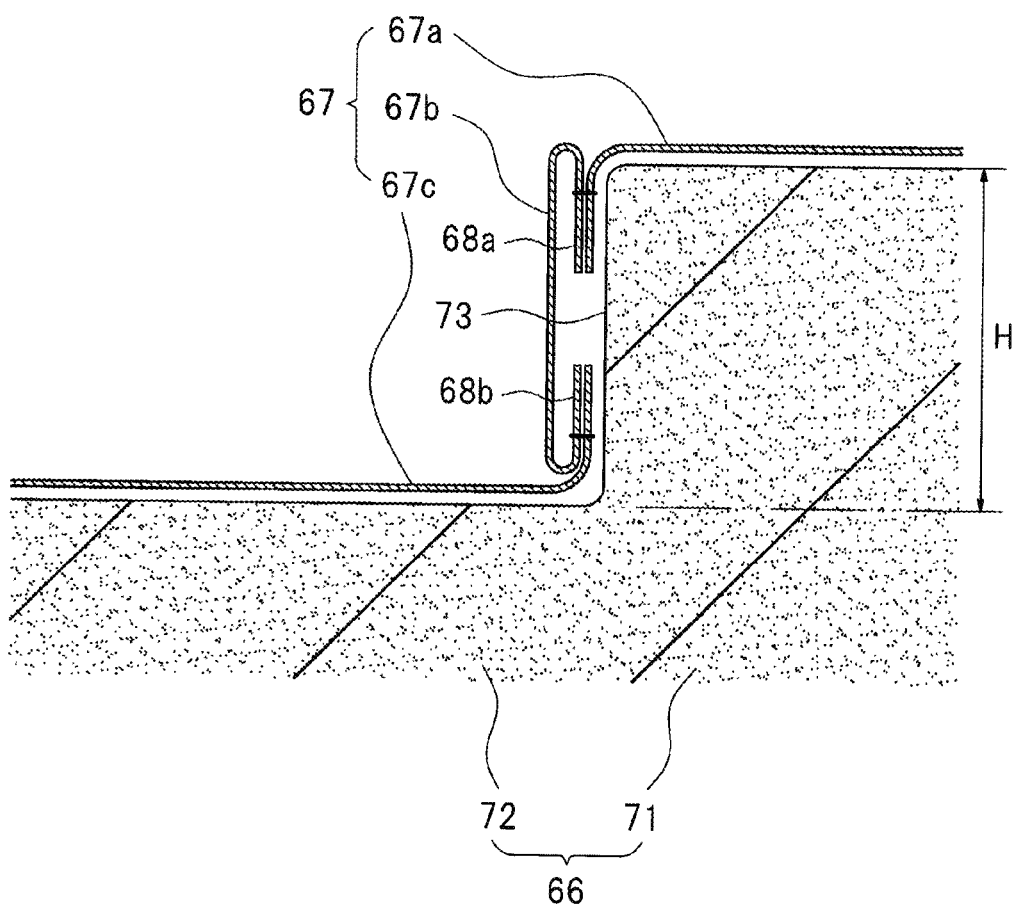
FIG. 9 is a section view of a part surrounded by the dashed circle IX of FIG. 8.

FIG. 7 shows a section of the front end part of the seat cushion 22.

The pad 46 of the seat cushion 22 includes a first pad part 51 and a second pad part 52 arranged adjacent to the first pad part 51. The first pad part 51 constitutes a pad of a thigh support 22a (see FIG. 5) formed in the central portion of the seat cushion 22 in the width direction, while the second pad part 52 constitutes pads of two side supports 22b (see FIG. 5) arranged on both sides of the thigh support 22a. The first and second pad parts 51 and 52 are integrally formed.

The front end of the second pad part 52 is situated backward of the front end of the first pad part 51 and is formed concave with respect to the front end of the first pad part 51, while a step portion 53 is formed along at least a part of the boundary between the front ends of the first and second pad parts 51 and 52. And, in the pad 46, there is formed a groove portion 54 which extends from the step portion 53 into between the first and second pad parts 51 and 52 vertically along the whole length of the step portion 53.

The trim cover 47 for covering the pad 46 includes, as the skin pieces thereof, a first body 47a for covering the upper end face of the first pad part 51 following the surface of the step portion 53, a first gore 47b jointed to the first body 47a for covering the surface of the step portion 53, a second body 47c for covering the upper end face of the second pad part 52 following the surface of the step portion 53, and a second gore 47d jointed to the second body 47c.

The respective edges of the first and second gores 47b and 47d are sewn together in a superimposed state and are stored in the groove portion 54 of the pad 46.

A seam allowance 48a of the first body 47a and first gore 47b is brought down to the first gore 47b side and is superimposed on the surface of the step portion 53. A seam allowance 48b of the second body 47c and second gore 47d is brought down to the second gore 47d side but is inserted into the groove portion 54. Thus, the seam allowance 48b will not be superimposed on the seam allowance 48a on the surface of the step portion 53.

Since the seam allowances 48a and 48b are not superimposed on each other on the surface of the step portion 53, it is possible to suppress occurrence of wrinkles or sags in the first gore 47b which is superimposed on the surface of the step portion 53 and appears on the external surface of the vehicle seat 21. This configuration can suppress the deteriorated appearance of the vehicle seat 21 caused by such wrinkles or sags. And, the width of the seam allowances 48a and 48b can be set properly in consideration of sewing workability etc. regardless of the size of the step height H of the step portion 53. Thus, this configuration can ease the constraints of the step height H of the step portion 53, thereby enabling enhancement in the freedom of design of the vehicle seat 21.

Here, in order to suppress the occurrence of wrinkles or sags in the first gore 47b by enhancing the rigidity of the first gore 47b appearing on the external surface of the vehicle seat 21, the respective edges of the first and second gores 47b and 47d to be stored into the groove portion 54 of the pad 46, as shown in FIG. 3, may be sewn together integrally with the reinforcing member, or, as shown in FIG. 4, may be sewn together by multiple rows of seams.

Although the invention has been described heretofore with reference to the step portion 13 of the seat back 3, the step portion 33 of the seat back 23, and the step portion 53 of the seat cushion 22, the invention can also be applied to the step portions of the other parts of a vehicle seat.

What is claimed is:

1. A vehicle seat comprising:
   a pad including:
   a first pad part;
   a second pad part arranged adjacent to the first pad part and formed concave with respect to the first pad part along at least a part of the boundary with the first pad;
   a step portion formed along at least a part of the boundary; and
   a groove portion extending from the step portion into between the first and second pad parts over the whole length of the step portion; and
   a trim cover configured to cover the pad integrally, the trim cover formed by sewing multiple skin pieces together, the skin pieces including:
   a first body configured to cover the surface of the first pad part following the surface of the step portion;
   a first gore, jointed to the first body, configured to cover the surface of the step portion;

a second body configured to cover the surface of the second pad part following the surface of the step portion;

a second gore jointed to the second body, wherein an edge of the first gore and an edge of the second gore are respectively stored in the groove portion;

a seam allowance of the first body and the first gore is superimposed on the surface of the step portion; and a seam allowance of the second body and the second gore is inserted into the groove portion.

2. The vehicle seat according to claim 1, wherein the edge of the first gore and the edge of the second gore are sewn together in a superimposed state.

3. The vehicle seat according to claim 2, wherein the edge of the first gore and the edge of the second gore are sewn together integrally with a reinforcing member.

4. The vehicle seat according to claim 2, wherein the edge of the first gore and the edge of the second gore are sewn together by multiple rows of parallel seams.

5. The vehicle seat according to claim 1, wherein the maximum value of the step height of the step portion is 15 mm or less.

6. The vehicle seat according to claim 2, wherein:
the edge of the first gore and the edge of the second gore are sewn together by a seam in the groove portion; and
the first body and the first gore are sewn together by a seam on the outside of the groove portion.

\* \* \* \* \*